United States Patent
Talmy et al.

Patent Number: 5,642,868
Date of Patent: Jul. 1, 1997

[54] CERAMIC MATERIAL

[75] Inventors: Inna G. Talmy, Silver Spring, Md.; Deborah A. Haught, Sterling, Va.

[73] Assignee: The United States of America as represented by the Secretary of the Navy, Washington, D.C.

[21] Appl. No.: 518,604

[22] Filed: May 2, 1990

[51] Int. Cl.[6] ................................. B64C 1/10
[52] U.S. Cl. ........................... 244/121; 501/125
[58] Field of Search ................. 501/128, 125; 244/117 R, 121

[56] References Cited

U.S. PATENT DOCUMENTS 3,856,545  12/1974  Ferrigno ........................ 106/462

*Primary Examiner*—Charles T. Jordan
*Assistant Examiner*—Anthony R. Chi
*Attorney, Agent, or Firm*—John Forrest; Roger D. Johnson

[57] ABSTRACT

A ceramic material which is (1) ceramics based on monoclinic $BaO \cdot Al_2O_3 \cdot 2SiO_2$; (2) ceramics based on monoclinic $SrO \cdot Al_2O_3 \cdot 2SiO_2$; or (3) ceramics based on monoclinic solid solution of $BaO \cdot Al_2O_3 \cdot 2SiO_2$ and $SrO \cdot Al_2O_3 \cdot 2SiO_2$.

20 Claims, 3 Drawing Sheets

STARTING MATERIAL: OXIDES AND SALTS

CERAMIC MATERIAL

BACKGROUND OF THE INVENTION

This invention relates to ceramics and more particularly to aluminosilicate ceramics.

Future classes of advanced tactical missiles will require new ceramic materials for radomes to meet the stringent requirements arising from greater speeds (up to Mach 8) and longer flight times. The critical need is to develop ceramic materials stable up to at least 1400° C. with low and thermally stable dielectric constant ($\epsilon$) and loss tangent, low coefficient of thermal expansion (CTE), and high thermal shock and rain erosion resistance. Presently used slip cast fused silica (SCFS) has excellent dielectric and thermal properties for radomes, but the relatively low strength and rain erosion resistance of this material limit its future application. For this reason, research conducted on radome materials is directed both toward improvement of the mechanical properties of SCFS and development of new candidate ceramics.

SUMMARY OF THE INVENTION

Accordingly, an object of this invention is to provide a ceramic material which has a thermally stable, low dielectric constant.

Another object of this invention is to provide a new ceramic material with a dielectric constant that only slightly changes with increasing temperature.

A further object of this invention is to provide a ceramic material which maintains its chemical composition and crystalline modification even at high temperatures.

Yet another object of this invention is to provide a ceramic material that is transparent to electromagnetic waves and has stable dielectric properties at high temperatures.

A still a further object of this invention is to provide a ceramic material suitable for high temperature dielectric applications such as missile radomes.

It is also an object of this invention to provide a ceramic material suitable for substrates for electronic components.

These and other objects of this invention are accomplished by providing:

a material which is ceramics based on monoclinic $BaO \cdot Al_2O_3 \cdot 2SiO_2$; or ceramics based on monoclinic $SrO \cdot Al_2O_3 \cdot 2SiO_2$;

or ceramics based on monoclinic, solid solution of from more than zero to less than 100 mole percent of $SrO \cdot Al_2O_3 \cdot 2SiO_2$ with $BaO \cdot Al_2O_3 \cdot 2SiO_2$ being the remainder, and a method of making this ceramic material.

This material can be used in radomes.

DETAILED DESCRIPTION OF THE PREFERRED EMBODIMENT

The ceramic materials of this invention are prepared from fine powders of pure monoclinic $BaO \cdot Al_2O_3 \cdot 2SiO_2$ and pure monoclinic $SrO \cdot Al_2O_3 \cdot 2SiO_2$. The powders preferably have a surface area of from about 3 to about 6 $m^2/g$ and more preferably from 4 to 5.5 $m^2/g$. The ceramic materials produced include pure monoclinic $BaO \cdot Al_2O_3 \cdot 2SiO_2$, pure monoclinic $SrO \cdot Al_2O_3 \cdot 2SiO_2$, and monoclinic $BaO \cdot Al_2O_3 \cdot 2SiO_2 / SrO \cdot Al_2O_3 \cdot 2SiO_2$ solid solutions prepared from intimate mixtures of the pure monoclinic $BaO \cdot Al_2O_3 \cdot 2SiO_2$ and pure monoclinic $SrO \cdot Al_2O_3 \cdot 2SiO_2$ powders in the desired proportions.

Specifically excluded from this invention are the hexagonal crystalline form of $BaO \cdot Al_2O_3 \cdot 2SiO_2$ and the hexagonal crystalline form of $SrO \cdot Al_2O_3 \cdot 2SiO_2$. Hexagonal $BaO \cdot Al_2O_3 \cdot 2SiO_2$ transforms reversibly into low temperature orthorhombic crystalline form at 300° C. This transformation is accompanied by significant volume changes which can weaken or damage the ceramic structures. Because of this fact, hexagonal $BaO \cdot Al_2O_3 \cdot 2SiO_2$ is of no practical use as a ceramic material for high temperature, especially, thermal cycling applications.

Figure 1:
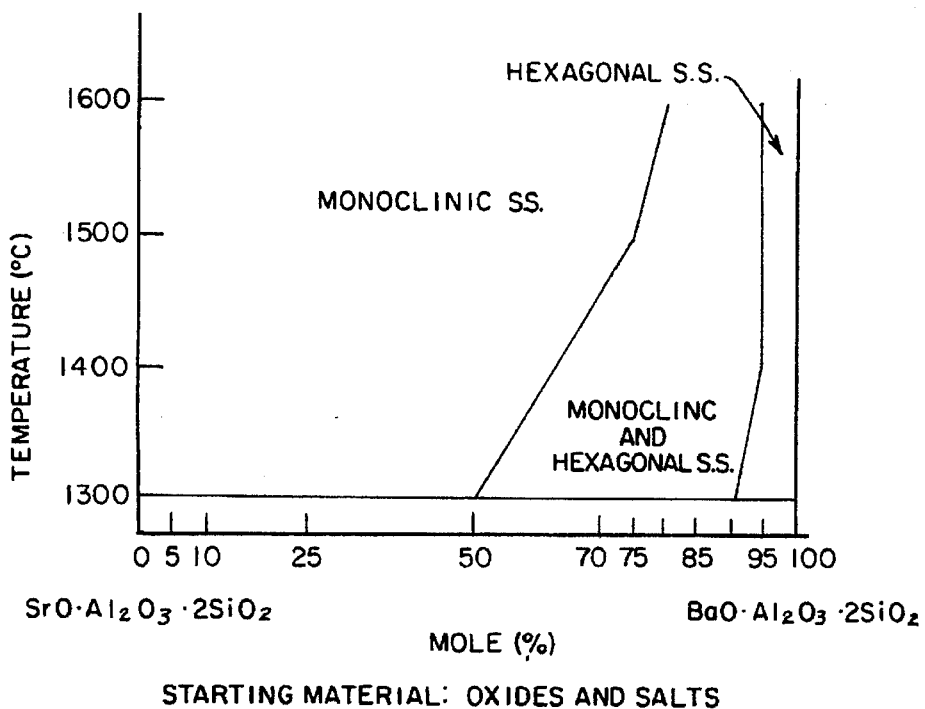
FIG. 1 is a phase diagram for the $SrO \cdot Al_2O_3 \cdot 2SiO_2 / BaO \cdot Al_2O_3 \cdot 2SiO_2$ system where the materials were prepared directly from oxides and salts as raw materials.
Figure 2:
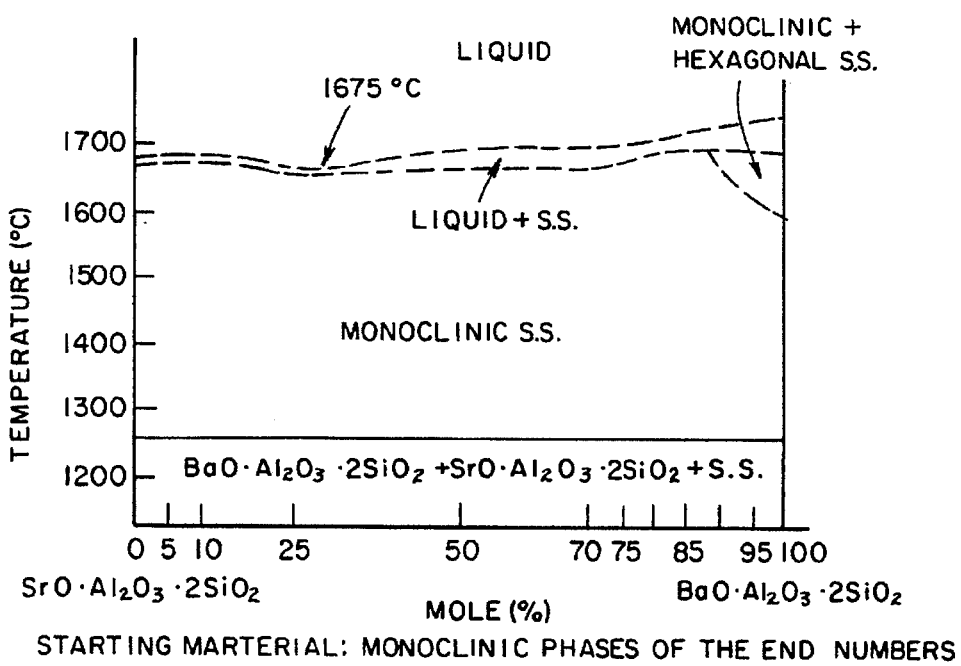
FIG. 2 is a phase diagram for the $SrO \cdot Al_2O_3 \cdot 2SiO_2 / BaO \cdot Al_2O_3 \cdot 2SiO_2$ system where the materials were prepared from previously synthesized monoclinic $SrO \cdot Al_2O_3 \cdot 2SiO_2$ and monoclinic $BaO \cdot Al_2O_3 \cdot 2SiO_2$ powders.

FIG. 1 is a phase diagram for the $SrO \cdot Al_2O_3 \cdot 2SiO_2 / BaO \cdot Al_2O_3 \cdot 2SiO_2$ system where the materials are prepared directly from oxides and salts ($BaCO_3$, $Al_2O_3$, $SiO_2$, and $SrCO_3$ powders). The hexagonal form of the $SrO \cdot Al_2O_3 \cdot 2SiO_2 / BaO \cdot Al_2O_3 \cdot 2SiO_2$ is difficult to avoid in the preferred ranges of composition when this method is used. In contrast, FIG. 2 is a phase diagram for the $SrO \cdot Al_2O_3 \cdot 2SiO_2 / BaO \cdot Al_2O_3 \cdot 2SiO_2$ system where the materials are prepared from fine powders of monoclinic $BaO \cdot Al_2O_3 \cdot 2SiO_2$ and monoclinic $SrO \cdot Al_2O_3 \cdot 2SiO_2$. As can be seen, the hexagonal form of the $SrO \cdot Al_2O_3 \cdot 2SiO_2 / BaO \cdot Al_2O_3 \cdot 2SiO_2$ solid solutions is easily avoided using this method.

Figure 3:
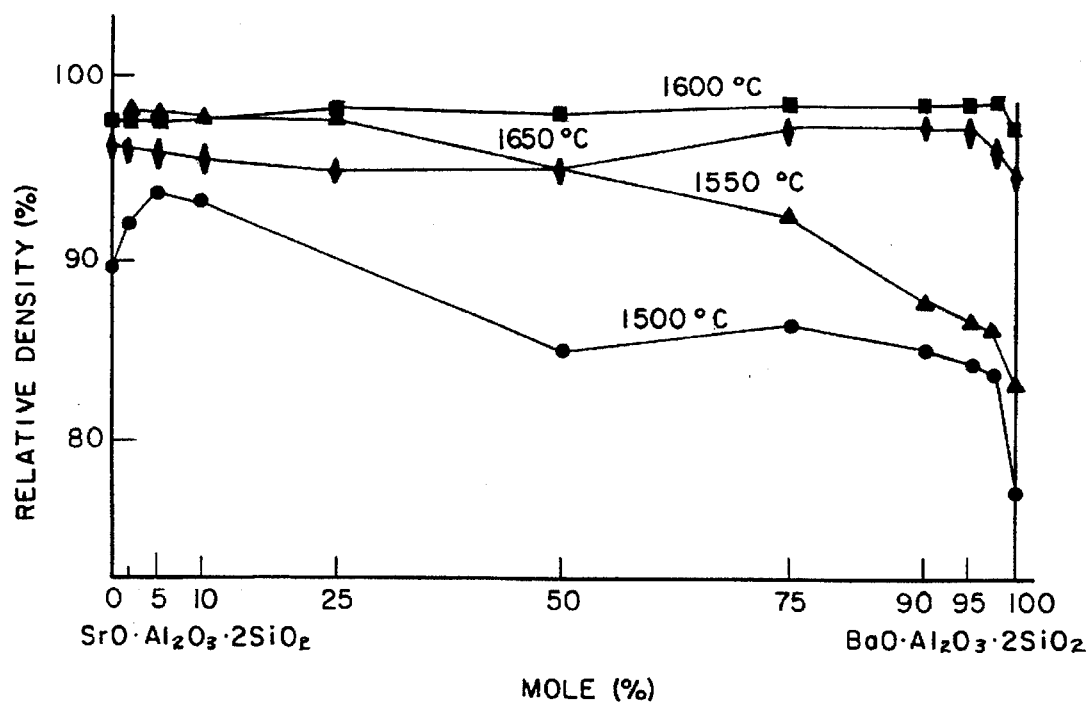
FIG. 3 is a graph showing the dependency of the relative density on composition and firing temperature for ceramics based on the $BaO \cdot Al_2O_3 \cdot 2SiO_2 / SrO \cdot Al_2O_3 \cdot 2SiO_2$ system.
Figure 4:
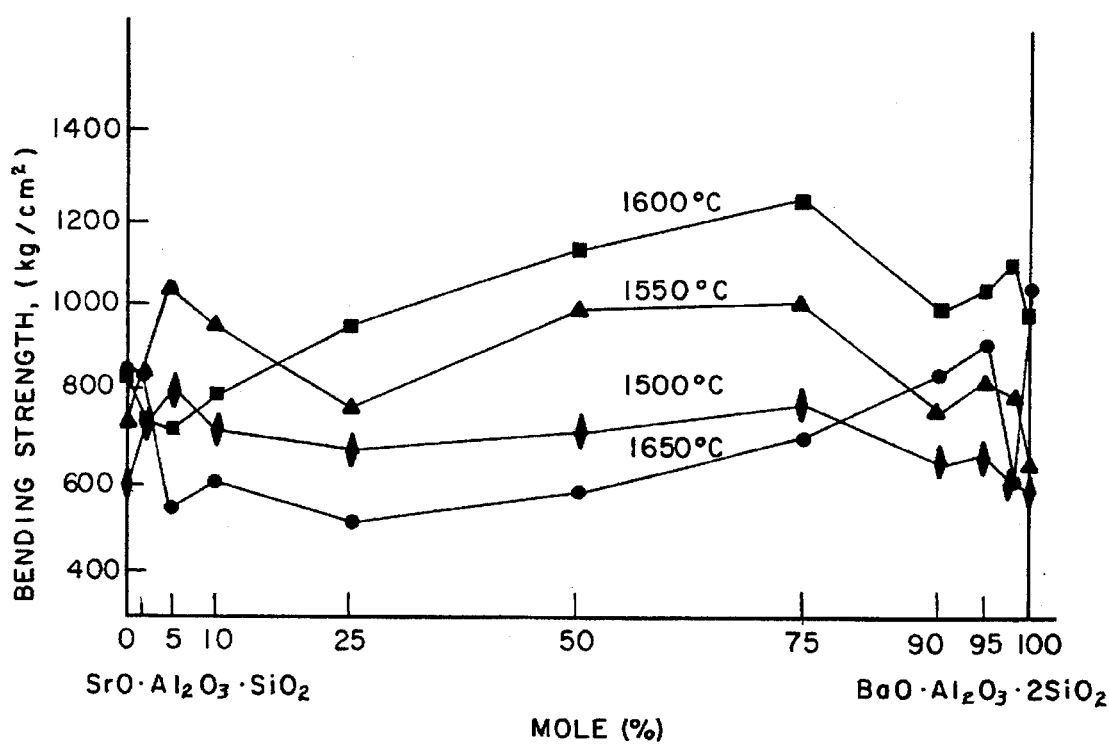
FIG. 4 is a graph showing the dependency of bending strength on composition and firing temperature for ceramics based on $BaO \cdot Al_2O_3 \cdot 2SiO_2 / SrO \cdot Al_2O_3 \cdot 2SiO_2$, system.

The ceramics based on solid solutions containing from more than zero to less than 100 mole percent of monoclinic $SrO \cdot Al_2O_3 \cdot 2SiO_2$ with the remainder being monoclinic $BaO \cdot Al_2O_3 \cdot 2SiO_2$ are more sinterable, are denser, and have greater bending strength than do the ceramic materials formed from either monoclinic $SrO \cdot Al_2O_3 \cdot 2SiO_2$ powder or monoclinic $BaO \cdot Al_2O_3 \cdot 2SiO_2$ powder alone when fired at optimum temperatures (see FIG. 3 and FIG. 4). Within that broad range, narrower, preferred ranges are selected to emphasize certain desirable properties. Ceramic based on monoclinic solid solutions having from 15 to 35 and preferably from 20 to 30 mole percent of monoclinic $SrO \cdot Al_2O_3 \cdot 2SiO_2$ with the remainder being monoclinic $BaO \cdot Al_2O_3 \cdot 2SiO_2$ have the greatest bending strength when fired at optimum temperature for producing the densest material (see FIG. 4).

Figure 5:
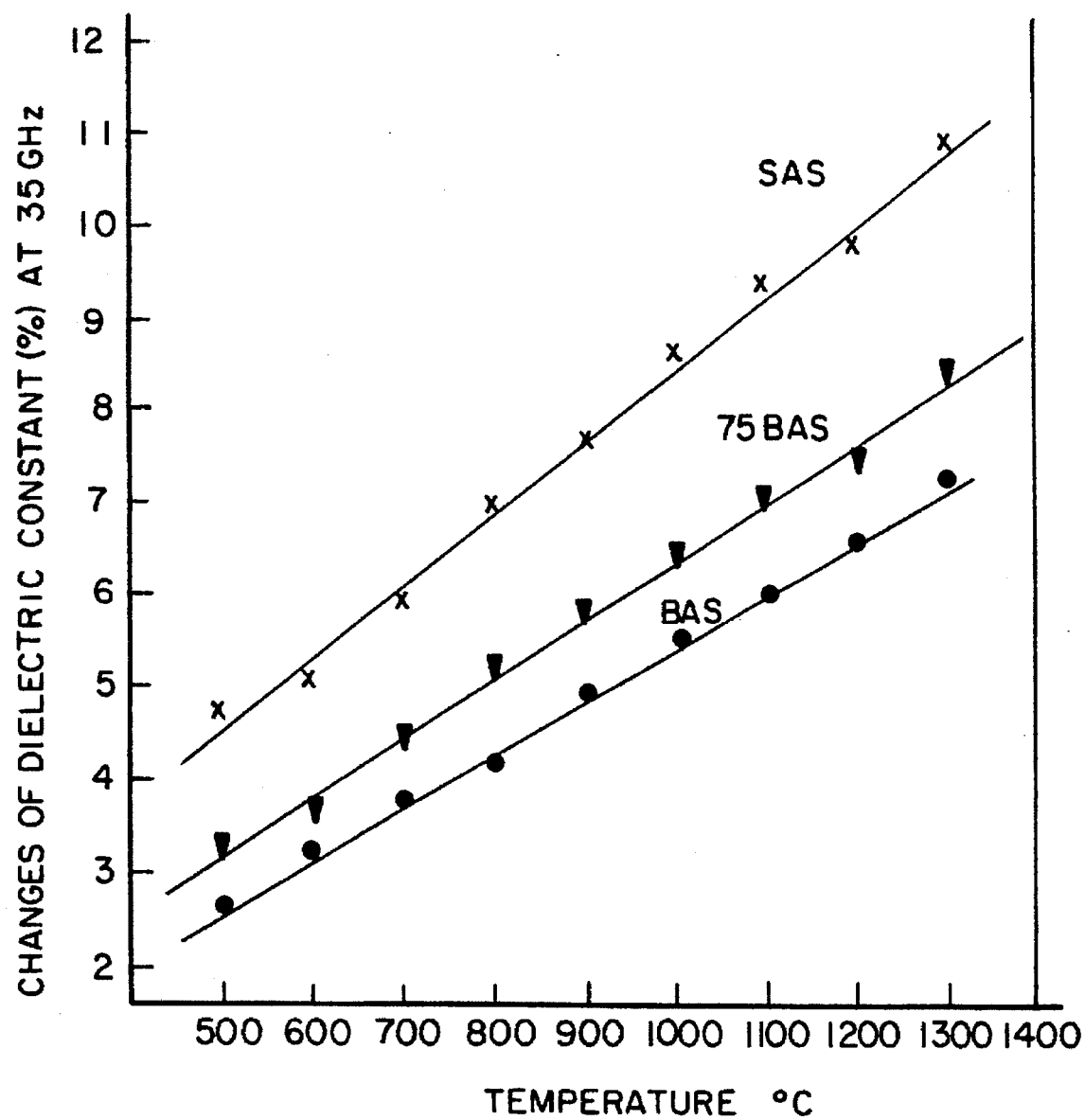
FIG. 5 is a graph showing the changes in dielectric constant with temperature for ceramics based on monoclinic $SrO \cdot Al_2O_3 \cdot 2SiO_2$, monoclinic $BaO \cdot Al_2O_3 \cdot 2SiO_2$, and a 25 mole percent $SrO \cdot Al_2O_3 \cdot 2SiO_2 / 75$ mole percent $BaO \cdot Al_2O_3 \cdot 2SiO_2$ monoclinic solid solution.

The most preferred solid solution compositions are those which are most useful for radomes. These compositions fall in the range of preferably from more than zero to 15, and more preferably from 5 to 10 mole percent of monoclinic $SrO \cdot Al_2O_3 \cdot 2SiO_2$ with the remainder being monoclinic $BaO \cdot Al_2O_3 \cdot 2SiO_2$. Ceramics based on monoclinic solid solutions of $BaO \cdot Al_2O_3 \cdot 2SiO_2$ and $SrO \cdot Al_2O_3 \cdot 2SiO_2$ in these ranges of composition have higher density and bending strength than monoclinic $BaO \cdot Al_2O_3 \cdot 2SiO_2$ alone (see FIG. 3 and FIG. 4). Moreover these solid solutions are stable in the monoclinic crystalline form at temperatures above 1590° C. whereas pure $BaO \cdot Al_2O_3 \cdot 2SiO_2$ is not. For example, at 1600° C. pure $BaO \cdot Al_2O_3 \cdot 2SiO_2$ transforms from the monoclinic to the hexagonal crystal form. In contrast, a solid solution containing 10 mole percent monoclinic $SrO \cdot Al_2O_3 \cdot 2SiO_2$ and 90 mole percent monoclinic $BaO \cdot Al_2O_3 \cdot 2SiO_2$ is stable in the monoclinic form at 1700° C. This means that the material may be used for radomes operating at higher temperatures. FIG. 5 and Table 1 show that the dielectric constant of a ceramic based on monoclinic $BaO \cdot Al_2O_3 \cdot 2SiO_2$ changes less significantly with increasing temperature than does a ceramic based on monoclinic $SrO \cdot Al_2O_3 \cdot 2SiO_2$, and ceramics based on solid solutions of these two falling proportionally in between.

When these materials are to be used in the manufacture of radomes, care must be taken not to introduce impurities. Thus natural materials such as kaolin or clay or technical grade purity chemicals containing significant amounts of impurities should not be used. Moreover, additives such as $B_2O_3$, LiF, $Cr_2O_3$ $CaF_2$, $ZrSiO_3$, etc., which promote the formation of monoclinic $BaO \cdot Al_2O_3 \cdot 2SiO_2$, must also be avoided. Impurities can distort the electromagnetic signals passing through the radome.

The monoclinic $BaO \cdot Al_2O_3 \cdot 2SiO_2$ ceramic materials, monoclinic $SrO \cdot Al_2O_3 \cdot 2SiO_2$ ceramic materials, and the monoclinic $BaO \cdot Al_2O_3 \cdot 2SiO_2/SrO \cdot Al_2O_3 \cdot 2SiO_2$ solid solution ceramic materials are made from high purity monoclinic $BaO \cdot Al_2O_3 \cdot 2SiO_2$ and high purity monoclinic $SrO \cdot Al_2O_3 \cdot 2SiO_2$ fine powders. The monoclinic $BaO \cdot Al_2O_3 \cdot 2SiO_2$ starting material can be prepared without seed crystals according to example 1. This monoclinic $BaO \cdot Al_2O_3 \cdot 2SiO_2$ is then used as seed crystals in the much easier process of example 2 to produced more monoclinic $BaO \cdot Al_2O_3 \cdot 2SiO_2$. The monoclinic $BaO \cdot Al_2O_3 \cdot 2SiO_2$ produced in example 2 can be used as seed crystals for further batches. The monoclinic $SrO \cdot Al_2O_3 \cdot 2SiO_2$ can be produced according to the process of example 3. The monoclinic $BaO \cdot Al_2O_3 \cdot 2SiO_2$ and the monoclinic $SrO \cdot Al_2O_3 \cdot 2SiO_2$ are each ground into very fine powders. These powders will preferably have a surface area of from 3 to 6 m²/g and more preferably of from 4 to 5.5 m²/g.

To prepare a ceramic based on monoclinic solid solution of a given composition, the appropriate amounts of monoclinic $BaO \cdot Al_2O_3 \cdot 2SiO_2$ and monoclinic $SrO \cdot Al_2O_3 \cdot 2SiO_2$ powders are intimately mixed (see example 4). Of course, the monoclinic $BaO \cdot Al_2O_3 \cdot 2SiO_2$ powder or the monoclinic $SrO \cdot Al_2O_3 \cdot 2SiO_2$ powder can each be used alone to produce either monoclinic $BaO \cdot Al_2O_3 \cdot 2SiO_2$ ceramics or monoclinic $SrO \cdot Al_2O_3 \cdot 2SiO_2$ ceramics.

Next the monoclinic $BaO \cdot Al_2O_3 \cdot 2SiO_2$ powder, or monoclinic $SrO \cdot Al_2O_3 \cdot 2SiO_2$ powder, or mixture of monoclinic $BaO \cdot Al_2O_3 \cdot 2SiO_2$ and $SrO \cdot Al_2O_3 \cdot 2SiO_2$ powders are formed into a green body. This is done by conventional methods such as cold pressing, cold isostatic pressing, extrusion, injection molding, or slip casting, etc. In addition to radomes of various shapes, other structures such as component substrates may be formed.

The green bodies are then fired at a temperature of preferably from about 1550° C. to less than 1590° C. and more preferably from 1550° C. to 1580° C. Referring to FIGS. 3 and 4 it can be seen that relative density and bending strength increase with increasing temperature. Note however that overfiring (1650° C.) results in a substantial reduction in these properties. Therefore, care is taken to keep the firing temperature below 1590° C.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Preparation of monoclinic $BaO \cdot Al_2O_3 \cdot 2SiO_2$ without seed crystals A uniform, stoichiometric, raw powder mixture of $BaCO_3$, $Al_2O_3$, and $SiO_2$ gel was prepared by the sequential addition of $BaCO_3$ powder and tetraethylorthosilicate (Silbond 40 from Stauffer Chemical Co.) in ethanol to a $NH_4OH$-stabilized $Al_2O_3$ (0.3 micron) suspension (pH 11). Ammonia served as a catalyst for the hydrolysis of the tetraethylorthosilicate. The mixture was continuously stirred until the hydrolysis was completed and then vacuum dried at 65°–70° C. The resulting powdered mixture was uniform and did not contain any agglomerates. The powder was pressed into pellets at 100 MPa and then fired at 1500° C. for about 150 hours. The product was monoclinic $BaO \cdot Al_2O_3 \cdot 2SiO_2$. It was ground to a particle size less than 60 microns for use as seeds in example 2.

EXAMPLE 2

Preparation of monoclinic $BaO \cdot Al_2O_3 \cdot 2SiO_2$ using monoclinic seeds Into a uniform, stoichiometric, raw powder mixture of $BaCO_3$, $Al_2O_3$ (0.3 microns), and $SiO_2$ gel prepare as described in example 1, was added the monoclinic $BaO \cdot Al_2O_3 \cdot 2SiO_2$ seed crystals (less than 60 microns in size) prepared in example 1. Batches containing 1, 3, 5, and 10 percent by weight of the monoclinic $BaO \cdot Al_2O_3 \cdot 2SiO_2$ seed crystals were prepared and then fired at 1250°–1500° C. for 5 hours. The addition of monoclinic seeds highly intensified the formation of monoclinic $BaO \cdot Al_2O_3 \cdot 2SiO_2$. Even the presence of 1 percent seeds significantly promoted the phase transformation from hexagonal to monoclinic $BaO \cdot Al_2O_3 \cdot 2SiO_2$ at 1250° C. Total phase transformation was accomplished by the addition of at least 5 percent by weight of the monoclinic $BaO \cdot Al_2O_3 \cdot 2SiO_2$ seed crystals. This was demonstrated by the batches containing 5 and 10 percent by weight of the seed crystals. Note that the completely transformed, 100 percent monoclinic $BaO \cdot Al_2O_3 \cdot 2SiO_2$ product can be ground to particles less than 60 microns in size and used as seed crystals for subsequent batches. In other words, the arduous process of example 1 is needed only to prepare an initial batch of monoclinic $BaO \cdot Al_2O_3 \cdot 2SiO_2$.

EXAMPLE 3

Preparation of monoclinic $SrO \cdot Al_2O_3 \cdot 2SiO_2$

A uniform, stoichiometric, raw powder mixture of $SrCO_3$, $Al_2O_3$, and $SiO_2$ gel was prepared by the sequential addition of $SrCO_3$ powder and tetraethylorthosilicate (Silbond 40 from Stauffer Chemical Co.) in ethanol to a $NH_4OH$-stabilized $Al_2O_3$ (0.3 micron) suspension (pH 11). Ammonia served as a catalyst for the hydrolysis of the tetraethylorthosilicate. The mixture was continuously stirred until the hydrolysis was completed and then was vacuum dried at 65°–70° C. The resulting dry raw powders were uniform and did not contain any agglomerates. The raw powder mixture was pressed into pellets at 100 MPa and then fired at 1050°–1400° C. for 5 hours. X-ray diffractograms showed that the reaction was practically completed at 1300° C. and the product consisted only of monoclinic $SrO \cdot Al_2O_3 \cdot 2SiO_2$.

EXAMPLE 4

Previously synthesized monoclinic $BaO \cdot Al_2O_3 \cdot 2SiO_2$ (BAS) and monoclinic $SrO \cdot Al_2O_3 \cdot 2SiO_2$ (SAS) were used as starting powders for the preparation of ceramics in the BAS-SAS system. The powders were ground in an attritor using $ZrO_2$ grinding media to surface area up to 5 $m^2/g$. Specimens having the following compositions were prepared:

| mole percent | |
|---|---|
| BAS | SAS |
| 100 | 0 |
| 98 | 2 |
| 90 | 10 |
| 75 | 25 |
| 50 | 50 |
| 25 | 75 |
| 10 | 90 |
| 5 | 95 |
| 2 | 98 |
| 0 | 100 |

All specimens were pressed at 100 MPa. Specimens of each of the compositions were fired at 1500° C., 1550° C., 1600° C. and 1650° C. with a holding time of 5 hours at each of those temperatures.

The dependence of relative density on composition and firing temperature is shown in FIG. 3. The specimens based on pure BAS were completely densified (open porosity close to zero) at 1600° C. and those based on pure SAS at 1550° C. The addition of SAS to BAS sharply enhanced densification at 1500°–1550° C. and only slightly at 1600° C. The addition of BAS to SAS in amounts up to 10 mole percent promotes densification at 1500° C. Materials containing up to 25 mole percent BAS had the best sinterability in the system and were completely densified at 1550° C. The decrease in density for specimens sintered at 1650° C. is due to overfiring. Pure BAS fired at 1650° C. consisted of only the hexagonal modification. The addition of 2 mole percent SAS significantly inhibited the hexagonal-to-monoclinic transformation, and 5 mole percent SAS practically stabilized the monoclinic form. Stabilization of the monoclinic modification of BAS with the addition of SAS decreases the sensitivity of BAS to sintering temperatures close to 1600° C. and increases the service temperature.

The microstructure of ceramics in the system was studied by SEM of polished specimens thermally etched at 1450° C. for 2 hours. All the specimens had fine grained structure with maximum grain size of about 5 microns.

Bending strength was measured in 3-point bending (2.54 mm span) using 4×4×40 mm bars. The bending strength of specimens of intermediate compositions fired at optimum sintering temperature was higher than that of the end members (FIG. 4). The highest strength of about 130 MPa was shown by specimens containing 75 mole percent BAS and 25 mole percent SAS (75BAS/25SAS), compared to about 80 and 100 MPa for SAS and BAS, respectively. The drop in strength for specimens fired at 1650° C. is due to overfiring.

Thermal expansion was measured with a differential dilatometer at temperatures up to 1500° C. using dense 25 mm long specimens and a sapphire reference. The coefficient of thermal expansion (CTE) of BAS was $4.56 \times 10^{-6}$/degree and of SAS was $4.92 \times 10^{-6}$/degree, in the 100°–1500° C. range, with linear dependence on temperature.

The dielectric properties of BAS, SAS, and 75BAS/25SAS ceramics were measured up to 1200° C. at 35 GHz. The dielectric data are summarized in Table 1 and FIG. 5. The loss tangent for the samples was very low despite noticeable levels of $ZrO_2$ impurities (up to 0.85% $ZrO_2$ from grinding media). At 1200° C., the loss tangent of BAS is $40 \times 10^{-4}$ and SAS is $50 \times 10^{-4}$, which for all practical applications is negligible. The 75BAS/25SAS specimen showed approximately 2 to 3 times higher loss tangent in the whole temperature range.

The relative increase in dielectric constant with temperature is smallest for BAS and largest for SAS ceramics despite the fact that the room temperature value for SAS is smallest. The results for the 75BAS/25SAS material fall between the end members according to its relative composition ratio.

TABLE 1

DIELECTRIC PROPERTIES OF CERAMICS IN THE SYSTEM
$BaO.Al_2O_3.2SiO_2 - SrO.AL_2O_3.2SiO_2$
AT 35 GHz AS A FUNCTION OF TEMPERATURE

| MATERIAL | TEMPERATURE (°C.) | DIELECTRIC CONSTANT ε | THERMAL CHANGES OF % | DIELECTRIC LOSS tan δ |
|---|---|---|---|---|
| $BaO.Al_2O_3.2SiO_2$ | RT | 6.55 | — | $8 \times 10^{-4}$ |
| | 500 | 6.73 | 2.8 | — |
| | 800 | 6.84 | 4.4 | — |
| | 1000 | 6.92 | 5.7 | $25 \times 10^{-4}$ |
| | 1200 | 7.00 | 6.8 | $40 \times 10^{-4}$ |
| $95BaO.Al_2O_3.2SiO_2$ | RT | 7.04 | — | $17 \times 10^{-4}$ |
| $5SrO.Al_2O_3.2SiO_2$ | 500 | 7.25 | 3.0 | $19 \times 10^{-4}$ |
| | 800 | 7.37 | 4.7 | $29 \times 10^{-4}$ |
| | 1000 | 7.46 | 5.9 | $42 \times 10^{-4}$ |
| | 1200 | 7.54 | 7.1 | $60 \times 10^{-4}$ |
| $75BaO.Al_2O_3.2SiO_2$ | RT | 6.88 | — | $25 \times 10^{-4}$ |
| $25SrO.Al_2O_3.2SiO_2$ | 500 | 7.11 | 3.3 | — |
| | 800 | 7.24 | 5.2 | — |

TABLE 1-continued

DIELECTRIC PROPERTIES OF CERAMICS IN THE SYSTEM
$BaO.Al_2O_3.2SiO_2$ - $SrO.Al_2O_3.2SiO_2$
AT 35 GHz AS A FUNCTION OF TEMPERATURE

| MATERIAL | TEMPERATURE (°C.) | DIELECTRIC CONSTANT $\epsilon$ | THERMAL CHANGES OF % | DIELECTRIC LOSS tan $\delta$ |
|---|---|---|---|---|
|  | 1000 | 7.33 | 6.5 | $43 \times 10^{-4}$ |
|  | 1200 | 7.40 | 7.6 | $65 \times 10^{-4}$ |
| $SrO.Al_2O_3.2SiO_2$ | RT | 6.16 | — | $11 \times 10^{-4}$ |
|  | 500 | 6.44 | 4.6 | — |
|  | 800 | 6.58 | 6.8 | — |
|  | 1000 | 6.68 | 8.4 | $30 \times 10^{-4}$ |
|  | 1200 | 6.77 | 9.9 | $50 \times 10^{-4}$ |

Obviously numerous modifications and variations of the present invention are possible in light of the above teachings. It is therefore to be understood that within the scope of the appended claims the invention may be practiced otherwise than as specifically described herein.

What is claimed is:

1. A radome comprising a ceramic material selected from the group consisting Of monoclinic $BaO.Al_2O_3.2SiO_2$, monoclinic $SrO.Al_2O_3.2SiO_2$, and monoclinic solid solutions comprising from more than zero to less than 100 mole percent $SrO.Al_2O_3.2SiO_2$ with the remainder being $BaO.Al_2O_3.2SiO_2$.

2. The radome of claim 1 wherein the ceramic material is composed of monoclinic $BaO.Al_2O_3.2SiO_2$.

3. The radome of claim 1 wherein the ceramic material is composed of monoclinic $SrO.Al_2O_3.2SiO_2$.

4. The radome of claim 1 wherein the ceramic material is a monoclinic solid solution of from more than zero to less than 100 mole weight percent of monoclinic $SrO.Al_2O_3.2SiO_2$ with the remainder being monoclinic $BaO.Al_2O_3.2SiO_2$.

5. The radome of claim 4 wherein the ceramic material is a monoclinic solid solution of from more than zero to 15 weight percent of monoclinic $SrO.Al_2O_3.2SiO_2$ with the remainder being monoclinic $BaO.Al_2O_3.2SiO_2$.

6. The radome of claim 5 wherein the ceramic material is a monoclinic solid solution of from 5 to 10 mole percent of monoclinic $SrO.Al_2O_3.2SiO_2$ with the remainder being monoclinic $BaO.Al_2O_3.2SiO_2$.

7. A material which is selected from the group consisting of a ceramic based on monoclinic $BaO.Al_2O_3.2SiO_2$; a ceramic based on monoclinic $SrO.Al_2O_3.2SiO_2$; and a ceramic based on monoclinic, solid solution of from more than zero to less than 100 mole percent of $SrO.Al_2O_3.2SiO_2$ with $BaO.Al_2O_3.2SiO_2$ being the remainder of the solid solution.

8. The material of claim 7 which is ceramic based on monoclinic $BaO.Al_2O_3.2SiO_2$.

9. The material of claim 7 which is ceramic based on monoclinic $SrO.Al_2O_3.2SiO_2$.

10. The material of claim 7 which is a ceramic based on monoclinic, solid solution of from more than zero to less than 100 mole percent of $SrO.Al_2O_3.2SiO_2$ with $BaO.Al_2O_3.2SiO_2$ being the remainder of the solid solution.

11. The material of claim 10 which is a ceramic based on monoclinic solid solution of from more than zero to 15 mole percent of $SrO.Al_2O_3.2SiO_2$ with $BaO.Al_2O_3.2SiO_2$ being the remainder of the solid solution.

12. The material of claim 11 which is a ceramic based on monoclinic solid solution of from 5 to 10 mole percent of $SrO.Al_2O_3.2SiO_2$ with $BaO.Al_2O_3.2SiO_2$ being the remainder of the solid solution.

13. The material of claim 7 which is a ceramic based on monoclinic, solid solution of from 15 to 35 mole percent of $SrO.Al_2O_3.2SiO_2$ with $BaO.Al_2O_3.2SiO_2$ being the remainder of the solid solution.

14. The material of claim 13 which is a ceramic based on monoclinic, solid solution of from 20 to 30 mole percent of $SrO.Al_2O_3.2SiO_2$ with $BaO.Al_2O_3.2SiO_2$ being the remainder of the solid solution.

15. A process for preparing a ceramic material comprising
  (1) preparing an intimate mixture of
    (a) from more than zero to less than 100 mole percent of monoclinic $SrO.Al_2O_3.2SiO_2$ powder with
    (b) monoclinic $BaO.Al_2O_3.2SiO_2$ powder being the remainder of the mixture;
  (2) forming the powder mixture into a green preform of a desired shape, and;
  (3) firing the green preform at a temperature of from 1550° to 1580° C. until a solid solution of $SrO.Al_2O_3.2SiO_2$-$BaO.Al_2O_3.2SiO_2$ is sintered (or densified) to required relative density.

16. The process of claim 15 wherein the mixture formed in step (1) comprises from more than zero to 15 mole percent of monoclinic $SrO.Al_2O_3.2SiO_2$ powder with the remainder of the mixture being monoclinic $BaO.Al_2O_3.2SiO_2$ powder.

17. The process of claim 16 wherein the mixture formed in step (1) comprises from 5 to 10 mole percent of monoclinic $SrO.Al_2O_3.2SiO_2$ powder with the remainder being monoclinic $BaO.Al_2O_3.2SiO_2$ powder.

18. The process of claim 15 wherein the mixture formed in step (1) comprises from 15 to 35 mole percent of monoclinic $SrO.Al_2O_3.2SiO_2$ powder with the remainder being monoclinic $BaO.Al_2O_3.2SiO_2$ powder.

19. The process of claim 18 wherein the mixture formed in step (1) comprises from 20 to 30 mole percent of monoclinic $SrO.Al_2O_3.2SiO_2$ powder with the remainder being monoclinic $BaO.Al_2O_3.2SiO_2$ powder.

20. The process of claim 15 wherein the green preform is formed in step (2) by cold pressing the powder mixture.

* * * * *